United States Patent [19]

Grosbois et al.

[11] 3,999,983

[45] Dec. 28, 1976

[54] METHOD OF RECOVERING THE CONSTITUENTS OF CATALYSTS COMPRISING AN ALUMINOUS CARRIER, PLATINUM AND IRIDIUM

[75] Inventors: Jean Grosbois, L'Isle Adam; Maryvonne Thomas, Boulogne-Billancourt, both of France

[73] Assignee: Rhone-Poulenc Industries, Paris, France

[22] Filed: Dec. 3, 1975

[21] Appl. No.: 637,157

[30] Foreign Application Priority Data

Dec. 12, 1974 France .............................. 74.40938

[52] U.S. Cl. .............................. 75/101 BE; 75/121; 423/22
[51] Int. Cl.² .................. C01G 55/00; C22B 61/00
[58] Field of Search ......... 423/22, 112; 75/101 BE, 75/121, 97 R

[56] References Cited

UNITED STATES PATENTS

| | | | |
|---|---|---|---|
| 2,371,119 | 3/1945 | Nachad | 423/22 |
| 2,863,760 | 12/1958 | Ashley et al. | 423/22 |
| 3,169,056 | 2/1965 | Bertolacini | 423/22 |
| 3,488,144 | 1/1970 | Sargent | 423/22 |

FOREIGN PATENTS OR APPLICATIONS

63,880   4/1971   Germany .............................. 423/22

*Primary Examiner*—Herbert T. Carter
*Attorney, Agent, or Firm*—McDougall, Hersh & Scott

[57] ABSTRACT

The invention concerns the recovery of the constituents of catalysts containing platinum and iridium. They are recovered by substantially totally solubilizing the catalysts with an oxidizing solution of hydrochloric acid, and by extracting the precious metals with an anionic resin from which the iridium is selectively washed out. This method enables the platinum and iridium to be completely separated and has the advantage of using only one bed of anionic resin.

7 Claims, No Drawings

METHOD OF RECOVERING THE CONSTITUENTS OF CATALYSTS COMPRISING AN ALUMINOUS CARRIER, PLATINUM AND IRIDIUM

The invention concerns a method of recovering the constituents of catalysts comprising on an aluminous carrier, variable quantities of iron, platinum and iridium.

Catalysts which comprise precious metals, such as platinum and iridium, and which have aluminous carriers are well known, particularly as catalysts for reforming hydrocarbons, and the recovery of these metals from catalyst waste or exhausted catalysts is obviously an economic necessity.

Various methods of recovering the metals have been proposed, either by partially dissolving the catalysts through solubilizing only the carrier, or by totally dissolving the catalysts. The various processes have different drawbacks, such as loss of precious metals, due to an excessive number of operations, and often incomplete separation of one metal from the other.

More recently applicants have proposed a process in patent application Ser. No. 524,777, filed Nov. 18, 1974, and entitled "A Method of Recovery of the Constituent Elements of Catalysts Based on Precious Metals". The method comprises substantially totally solubilizing the catalysts with hydrochloric acid and retaining the precious metals separately on beds of anionic resins, by suitably changing the valencies of the metals in their complexes during the operations.

This method gives good results but is difficult to apply to catalysts which also contain variable quantities of iron or other metals behaving in a similar way, since these are retained by the anionic resins at the same time as the platinum and iridium.

The new method now proposed is similarly initiated substantially totally solubilizing the catalysts with hydrochloric acid, in such a way that the platinum and iridium are, at the same time, brought to their state of higher valency in their complexes, thus enabling them to be retained together on an anionic resin. Before passing over the resin, the solution resulting from this action is diluted, according to its content of iron or other metals and according to the concentration of $Cl^-$ ions, in such a way that the iron or other metals are not retained by the resin. The solution, thus treated, contains aluminum and is treated to recover the metal from it in chloride form. The iridium is then separated from the platinum by bringing it selectively over the resin itself in the trivalent state in its complexes, and then by washing it out with a solution of hydrochloric acid. However, since the resin then retains only the platinum, it is calcined to recover the metal from it.

In practice a certain number of details have to be specified for carrying out the process:

a. In order to obtain substantially total solubilization of the catalysts, the aqueous solution of hydrochloric acid must have a concentration of from 3 to 9 moles per liter and must obviously be used in sufficient quantities.

b. In order to bring the platinum and iridium to their higher valency, the solution must be given an oxidizing character, the most appropriate oxidizing agent being concentrated nitric acid, used at 1 to 5 ml per liter of solution; however, other oxidizing agents are also suitable, such as chlorine, chlorites, chlorates and hydrogen peroxide.

c. Retention of the iron and other metals on the resin takes place when the metals are in the state of anionic complexes in the solutions resulting from the reaction. It has been found essential to dilute the solution if the formation of complexes is to be avoided. The amount of dilution depends both on the concentration of iron or other metals and the concentration of $Cl^-$ ions. To give some additional details, a solution of a concentration of 6 M/l of $Cl^-$ must be diluted by about twice the amount if it contains from 0.2 to 0.9 g/liter of iron, and must be diluted by about three times the amount if it contains from 1.5 to 5 g/liter of iron.

d. When the anionic resin has combined (chargee) with platinum and iridium, it is desirable to wash it with dilute hydrochloric acid, then with purified water, in order to eliminate the remaining aluminum chloride.

e. Reducing solutions, which may then be used to convert the iridium to the trivalent state on the resin, may vary considerably, but must allow for rapid reduction at fairly low temperature, e.g. at about 50° C, and must not yield any inconvenient oxidation products. Finally, they must be fairly selective so that the platinum complexes are not also changed and made liable to be drawn off when the iridium is subsequently washed out with solutions of hydrochloric acid. In practice, these solutions may advantageously be based e.g. on formaldehyde and ammonium acetate or sodium acetate or based on hexamethylenetetramine with the pH adjusted to from 4 to 6. A method of this type firstly has the advantage that catalysts with any content of iron can be treated; the iron content can moreover be substantially zero, as may be the case with discarded new catalysts. Other advantages are that only one bed of resin is used and that the iridium is recovered directly as chloroiridic acid; this may be more helpful than to obtain it in the divided metallic state in which it is often difficult to solubilize, as may be the case in the method disclosed in the above-mentioned patent application. It should be noted, however, that during the reaction on the catalysts, part of the iridium may not be reacted and will remain in the residual sludge; the sludge is then treated in knwon manner to recover the metal from it.

It so happens that some catalysts also contain metals, such as bismuth, antimony, tin, ruthenium, palladium and rhenium. The first three of these metals are extracted with the precious metals but can easily be separated from them by known methods. The last three are extracted slightly with the precious metals, but can be left there if they are in small proportions.

Finally, it is obvious that the initial state of the catalysts to be treated according to the invention greatly affects the possibilities of dissolving them. Exhausted catalysts, in particular, are combined (chargee) with some quantity of carbon, from which they can be freed only by some degree of oxidizing calcination, making the precious metals less liable to attack. The same result is obtained when the catalysts have been used under severe conditions of heat. From this point of view, the method favors the completest possible dissolution, on account of the distinctly oxidizing action employed.

In order to illustrate the invention, an example will now be given of the complete treatment of a catalyst containing platinum, iridium and iron, on an aluminous carrier.

EXAMPLE 5 kg of catalyst containing 0.5% by weight of iron is calcined for 2 hours at 400° C to destroy the organic materials, then acted on under reflux with 50 liters of 20% hydrochloric acid (6 M/l) and 0.1 liter of 58% nitric acid in an externally heated, glass-lined reactor.

After 3 hours reaction, at a temperature of about 110° C, the solution is drawn off and filtered. A dry residue, weighing 10.8 g, is obtained, essentially containing silica and alpha alumina. The platinum and iridium are present in the form of traces in the residue; allowing for its very low weight, this represents very substantially complete dissolution of the precious metals.

The clear solution obtained is diluted, volume for volume, with the water purified by ion exchange. 0.1 liter of 58% nitric acid is added, and the solution is brought to 70° C in a heater before being passed over a bed of strong anionic resin (DUOLITE A101D and supplied in France by Messrs. DIA-PROSIM). The platinum and iridium remain firmly fixed to the resin, while the effluent solution contains the aluminum and substantially all the iron.

The resin, containing the precious metals, is rinsed with a dilute aqueous solution of hydrochloric acid containing 0.1 M/l to eliminate the last races of iron, then with water purified by ion exchange, until the solution discharged has a pH of 4 to 5.

A reducing solution, containing 0.2 M/l of formaldehyde, 0.2 M/l of sodium acetate and enough hydrochloric acid to adjust the pH to 5.5, is brought to 70° C in the heater, then passed slowly over the bed of resin until the interstitial solution is renewed. Then the equivalent of one volume of solution per volume of resin is introduced in the course of one hour and left to react for two hours.

The reducing solution is then removed by washing with water purified by ion exchange; this is continued until there are no more sodium ions in the effluent.

The iridium is then washed out with a solution of 2 M/l hydrochloric acid at 70° C. Since the solution, which has passed through the resin where the iridium is in a trivalent state, is yellowish-green, its diminishing content of iridium can be followed by continuous spectrophotometric measurement. The washing process may be interrupted when the remaining iridium content of the resin becomes negligible; in the present case this would take 20 liters of the hydrochloric acid solution. The solution, containing 2.35 g of iridium, is then concentrated until the chloroiridic acid crystallizes.

The resin, on which the platinum remained fixed, is rinsed with water, purified by ion exchange, and is then dried and calcined gradually to 800° C in an oxidizing atmosphere. In this way, 17.6 g of a metallic powder is recovered, consisting chiefly of platinum and containing only very small quantities of iridium.

The quantities of precious metals recovered correspond substantially to the full quantities present in the catalyst treated.

We claim:

1. A method of recovering the constituents of catalysts containing platinum, iridium, iron and other metals on an aluminous carrier comprising the steps of reacting the catalyst substantially to dissolve the catalyst with a solution of hydrochloric acid having a concentration of 3 to 9 moles per liter and containing an oxidizing agent selected from the group consisting of nitric acid, chlorine, chlorite, chlorate and hydrogen peroxide, diluting the solution with water to prevent the formation of complexes of iron and other metals reacting similarly thereto, passing the solution into contact with an anionic exchange resin for retaining platinum and iridium, reducing the iridium to the trivalent state by treating the resin with a reducing agent in solution, washing the treated resin with hydrochloric acid solution having a concentration of 1 to 3 moles per liter to remove the trivalent iridium as chloroiridic acid, and calcining the remaining resin to recover platinum.

2. The method as claimed in claim 1 in which the oxidizing agent is added to the aqueous solution of hydrochloric acid in an amount equivalent to 1 to 5 ml of concentrated nitric acid per liter of solution.

3. The method as claimed in claim 1 in which the reducing agent comprises formaldehyde and an acetate selected from the group consisting of ammonium acetate and sodium acetate.

4. The method as claimed in claim 3 in which the solution containing the reducing agent has a pH within the range of 4 to 6.

5. The method as claimed in claim 1 in which the reducing agent comprises hexamethylenetetramine.

6. The method as claimed in claim 5 in which the solution containing the reducing agent has a pH within the range of 4 to 6.

7. The method as claimed in claim 1 which includes the steps of washing the anionic exchange resin with dilute hydrochloric acid solution and then with water before treating to reduce the iridium to the trivalent state.

* * * * *